(12) United States Patent
Yoo et al.

(10) Patent No.: US 11,373,634 B2
(45) Date of Patent: Jun. 28, 2022

(54) ELECTRONIC DEVICE FOR RECOGNIZING ABBREVIATED CONTENT NAME AND CONTROL METHOD THEREOF

(71) Applicant: Samsung Electronics Co., Ltd., Suwon-si (KR)

(72) Inventors: Jiwon Yoo, Suwon-si (KR); Jihun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 16/668,902

(22) Filed: Oct. 30, 2019

(65) Prior Publication Data
US 2020/0152172 A1 May 14, 2020

(30) Foreign Application Priority Data

Nov. 14, 2018 (KR) .......................... 10-2018-0139541

(51) Int. Cl.
| | | |
|---|---|---|
| *G10L 15/08* | (2006.01) | |
| *G10L 15/02* | (2006.01) | |
| *G10L 15/22* | (2006.01) | |
| *G06F 16/9035* | (2019.01) | |
| *G06F 16/9032* | (2019.01) | |
| *G06F 16/903* | (2019.01) | |
| *G06F 16/951* | (2019.01) | |

(52) U.S. Cl.
CPC .......... *G10L 15/02* (2013.01); *G06F 16/9035* (2019.01); *G06F 16/90332* (2019.01); *G06F 16/90344* (2019.01); *G06F 16/951* (2019.01); *G10L 15/08* (2013.01); *G10L 15/22* (2013.01); *G10L 2015/027* (2013.01); *G10L 2015/088* (2013.01); *G10L 2015/223* (2013.01)

(58) Field of Classification Search
CPC ... G10L 15/00–15/34; G06F 16/903–16/9038; G06F 16/951
See application file for complete search history.

(56) References Cited

U.S. PATENT DOCUMENTS

| 8,655,646 B2 | 2/2014 | Lee et al. |
| 2008/0140398 A1* | 6/2008 | Shpigel .................. G10L 15/26 704/235 |

(Continued)

FOREIGN PATENT DOCUMENTS

| JP | 2012-22354 A | 2/2012 |
| KR | 10-0755678 | 8/2007 |

(Continued)

*Primary Examiner* — Abul K Azad
(74) *Attorney, Agent, or Firm* — Staas & Halsey LLP

(57) ABSTRACT

An electronic device secures diversity of a user utterance with respect to a content name when a user searches a content through a display device by utilizing a voice. A method by an electronic device includes steps of receiving input of a user voice, acquiring a keyword related to a content included in the user voice, and acquiring at least one modified keyword based on the keyword, acquiring a plurality of search results corresponding to the keyword and the at least one modified keyword, comparing the keyword and the modified keyword with the plurality of search results and acquiring a content name corresponding to the keyword, and updating a database of content names based on the keyword, the modified keyword, and the final content name.

16 Claims, 11 Drawing Sheets

(56) References Cited

U.S. PATENT DOCUMENTS

| | | | |
|---|---|---|---|
| 2008/0154856 A1* | 6/2008 | Riise | G06F 16/3338 |
| 2015/0242898 A1* | 8/2015 | Gupta | G06F 16/9537 |
| | | | 705/14.54 |
| 2018/0101616 A1* | 4/2018 | Ma | G06F 16/9536 |
| 2019/0236216 A1* | 8/2019 | Batta | G06F 16/90328 |
| 2020/0211534 A1* | 7/2020 | Horie | G10L 15/26 |

FOREIGN PATENT DOCUMENTS

| | | |
|---|---|---|
| KR | 10-0837797 | 6/2008 |
| KR | 10-1001618 | 12/2010 |
| KR | 10-2018-0044800 | 5/2018 |

\* cited by examiner

FIG. 10A

| M | y |   | lovely girl
| M | y |   | ID is Gangnam Beauty

FIG. 10B

| M | y | | lovely girl |
| M | y | | So lovely girl | under 35
ELECTRONIC DEVICE FOR RECOGNIZING ABBREVIATED CONTENT NAME AND CONTROL METHOD THEREOF

CROSS-REFERENCE TO RELATED APPLICATION(S)

This application is based on and claims priority under 35 U.S.C. § 119(a) of a Korean patent application number 10-2018-0139541, filed on Nov. 14, 2018, in the Korean Intellectual Property Office, the disclosure of which is incorporated by reference herein in its entirety.

BACKGROUND

Field

The disclosure relates to a display device of a voice recognition system and a control method thereof, and more particularly, to a device that provides convenience to a user by securing diversity of a user utterance with respect to a content name when a user searches a content through a display device by utilizing a voice, and a method thereof.

Description of Related Art

Recently, a lot of coined words which express conventional words, phrases, or sentences in abbreviated forms are being generated, and following this phenomenon, abbreviated expressions are being used frequently for titles of contents such as dramas and movies. For example, a title 'Omniscient Point of View for Meddling' is generally referred to as 'Omni Meddling View,' and a title 'You Who Came from the Stars' is generally referred to as 'You from the Stars.'

In the past, in case a user uttered a content name in an abbreviated form that was not registered in a database of content names provided by a service provider, the content name was not matched with the actual content name existing in the entity dictionary, and thus the utterance could not lead to provision of a function that the user wanted. Accordingly, in the past, improvement of the performance of a system could be made by manually registering such a content name in an abbreviated form as a modified form of the corresponding content name in a database of content names. Also, there was inconvenience that, before manually registering a content name in an abbreviated form in a database of content names as above, functions could not be operated properly.

That is, in the past, there was inconvenience that, whenever a new content was generated or an abbreviated expression of an existing content was generated, a user had to manually register by himself a content name in an abbreviated form in a database of content names provided by a service provider, and then map the content name with the content name provided by the provider.

SUMMARY

The disclosure is for addressing the aforementioned need, and the purpose of the disclosure is in providing convenience for a user utterance by extracting a modified content name from a user utterance and automatically updating a database of content names, even if a user utters a content name in an abbreviated form that is not registered in a database of content names provided by a service provider.

A method by an electronic device according to an embodiment of the disclosure for achieving the aforementioned task includes receiving input of a user voice, acquiring a keyword related to a content included in the user voice, and acquiring at least one modified keyword based on the acquired keyword, acquiring a plurality of search results corresponding to the acquired keyword and the acquired at least one modified keyword, comparing the acquired keyword and the acquired modified keyword with the acquired plurality of search results and acquiring a content name corresponding to the acquired keyword, and updating a database of content names based on the acquired keyword, the acquired modified keyword, and the acquired content name.

Meanwhile, of the acquiring of at least one modified keyword, a text corresponding to an abbreviated expression of a content name among words included in the user voice may be acquired as the acquired keyword.

Also, the acquiring of at least one modified keyword may further include identifying the acquired keyword in units of syllables, and acquiring at least one word phrase wherein adjacent syllables are combined with each of the identified syllables, and a text including the acquired at least one word phrase may be acquired as a modified keyword.

In addition, in acquiring of at least one modified keyword, a text including a word phrase included in a vocabulary dictionary among texts including the acquired at least one word phrase may be acquired as the modified keyword.

Meanwhile, the step of acquiring the acquired plurality of search results may further include acquiring a plurality of search queries with respect to the acquired keyword and the acquired at least one modified keyword, and a search result may be crawled through an external server based on the acquired plurality of search queries.

Also, the acquiring of a content name may further include filtering the plurality of search results, and a search result including the acquired content name included in the database of content names among the acquired plurality of search results may be acquired.

In addition, the acquired plurality of search results may include at least one first search result with respect to the acquired keyword and at least one second search result with respect to each of the acquired at least one modified keyword. Also, filtering may be performed with respect to a search result including information commonly included in the first search result and the second search result among the acquired plurality of search results.

In addition, the process of acquiring a content name may further include with respect to the acquired plurality of search results, performing character string comparison with the acquired keyword and the acquired at least one modified keyword, and identifying at least one search result including a degree of similarity equal to or greater than a predetermined degree of similarity based on the performing character string comparison. Also, a text included in a search result having a highest degree of similarity among the identified search results may be acquired as the content name.

Meanwhile, an electronic device according to an embodiment of the disclosure for achieving the aforementioned task may include a communicator performing communication with an external server, and a processor configured to acquire a keyword related to a content included in a user voice input through a microphone, and acquire at least one modified keyword based on the acquired keyword, acquire a plurality of search results corresponding to the acquired keyword and the acquired at least one modified keyword from the external server, compare the acquired keyword and the acquired at least one modified keyword with the acquired plurality of search results and acquire a content name corresponding to the acquired keyword, and update a database of content names based on the acquired keyword, the acquired at least one modified keyword, and the acquired content name.

Also, the processor may acquire a text corresponding to an abbreviated expression of a content name among the words included in the user voice as the keyword.

In addition, the processor may identify the acquired keyword in units of syllables, acquire at least one word phrase which adjacent syllables are combined with each of the identified syllables, and acquire a text including the acquired at least one word phrase as a modified keyword.

Further, the processor may acquire a text including a word phrase included in a vocabulary dictionary among texts including the acquired at least one word phrase as the modified keyword.

Also, the processor may acquire a plurality of search queries with respect to the acquired keyword and the acquired at least one modified keyword, and crawl a search result through an external server based on the acquired plurality of search queries.

In addition, the processor may filter the acquired plurality of search results by acquiring a search result including the acquired content name included in the database of content names among the acquired plurality of search results.

Meanwhile, the acquired plurality of search results may include at least one first search result with respect to the acquired keyword and at least one second search result with respect to each of the acquired at least one modified keyword, and the processor may perform filtering with respect to a search result including information commonly included in the first search result and the second search result among the acquired plurality of search results.

Also, the processor may, with respect to the acquired plurality of search results, perform character string comparison with the acquired keyword and the acquired at least one modified keyword, identify at least one search result including a degree of similarity equal to or greater than a predetermined degree of similarity based on the character string comparison result, and acquire a text included in a search result having a highest degree of similarity among the identified search results as the content name.

According to the various embodiments of the disclosure as described above, the disclosure may provide a voice search environment wherein convenience of use has been improved, by generating and updating an abbreviated form of a content name automatically without a separate manual updating operation of a database of content names, even if a content name in an abbreviated form mainly used by users recently is uttered instead of a content name in a form provided by a service provider.

BRIEF DESCRIPTION OF THE DRAWINGS

FIG. 10A is a diagram for illustrating an exemplary case of recognition of a content name in an abbreviated form by an electronic device according to an embodiment of the disclosure; and FIG. 10B is a diagram for illustrating an exemplary case of recognition of a content name in an abbreviated form by an electronic device according to an embodiment of the disclosure.

DETAILED DESCRIPTION

Figure 1:
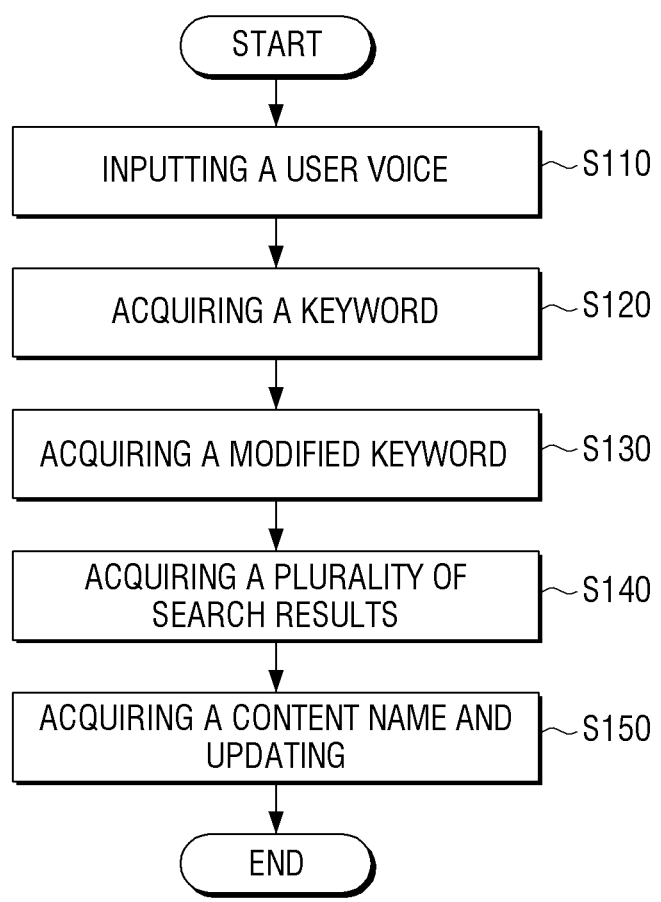
FIG. 1 is a diagram for illustrating recognition and updating of an abbreviated content name included in a user voice by an electronic device according to an embodiment of the disclosure.

Hereinafter, various embodiments of the disclosure will be described with reference to the accompanying drawings. However, it should be noted that the various embodiments are not for limiting the technology described in the disclosure to a specific embodiment, but they should be interpreted to include various modifications, equivalents and/or alternatives of the embodiments of the disclosure. Also, with respect to the detailed description of the drawings, similar components may be designated by similar reference numerals.

Also, the expressions "first," "second" and the like used in the disclosure may be used to describe various elements regardless of any order and/or degree of importance. Also, such expressions are used only to distinguish one element from another element, and are not intended to limit the elements. For example, a first user device and a second user device may refer to user devices that are different from each other, regardless of any order or degree of importance. Accordingly, a first element may be called a second element, and a second element may be called a first element in a similar manner, without departing from the scope of the disclosure.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Meanwhile, the terms used in the disclosure are just used to explain certain embodiments of the disclosure, and are not intended to limit the scope of the other embodiments. Also, singular expressions may include plural expressions, unless defined obviously differently in the context. The terms used in the disclosure, including technical or scientific terms, may have meanings identical to those generally known to those of ordinary skill in the art described in the disclosure. Terms defined in general dictionaries among the terms used herein may be interpreted to have the same meaning as or a similar meaning to the contextual meaning in the related art. Unless defined obviously in the disclosure, the terms used herein may not be interpreted to have an ideal or overly formal meaning. In some cases, even terms defined herein may not be interpreted to exclude the embodiments herein.

An electronic device according to the various embodiments of the disclosure may include at least one of, for example, a television, a smartphone, a tablet PC, a mobile phone, a video phone, an e-book reader, a desktop PC, a laptop PC, a netbook computer, a digital video disk (DVD) player, an audio, a refrigerator, an air conditioner, a cleaner, an oven, a microwave oven, a washing machine, an air cleaner, a set top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, or an electronic photo frame.

Hereinafter, various embodiments of the disclosure will be described in detail with reference to the accompanying drawings. FIG. 1 is a diagram for illustrating recognition and updating of an abbreviated content name included in a user voice by an electronic device according to an embodiment of the disclosure.

The electronic device 100 may receive input of a user voice at operation S110. Here, the electronic device 100 may search a content according to a user command and play it for the user. That is, the electronic device 100 may be implemented as various electronic devices equipped with a microphone for recognizing user commands such as a TV, a smart TV, an AI speaker, a set top box, and a media box. However, this is merely an example, and a user command may be recognized through a separate external device (e.g., a remote controller), and the electronic device 100 may receive data corresponding to the recognized user command, and play a content. However, hereinafter, explanation will be made based on an embodiment wherein the electronic device 100 directly receives a user command, and plays a content.

Meanwhile, a user voice may include a name for a content that a user wishes to watch. Such a name for a content may be a full name of a content, but it may also be an abbreviated form for a content. For example, in case 'My So Lovely Girl' is a full name of a content, a user may utter 'Please play my so lovely girl,' or utter 'Play my lovely girl.'

The electronic device 100 may acquire a keyword in a user utterance at operation S120. Specifically, the electronic device 100 may recognize syllables included in a user utterance through a voice recognition technic, and recognize a user utterance per syllable through a syllable section technic. Such voice recognition may be performed at a processor inside the electronic device 100, or performed through an external server 200.

Describing through the aforementioned embodiment, in case a user commands 'Play my lovely girl,' the electronic device 100 may recognize 'play' as a command that a user generally inputs for playing a content. Ultimately, the electronic device 100 may determine 'my lovely girl' as a keyword related to a content.

Meanwhile, the electronic device 100 may acquire a modified keyword for the acquired keyword at operation S130. Specifically, for each syllable of the acquired keyword, the electronic device 100 may compare a combination of each syllable and the syllables on both sides with a vocabulary dictionary, and determine a combination of syllables that exists in a vocabulary dictionary. That is, the electronic device 100 may determine a keyword including a combination of syllables that exists in a vocabulary dictionary as a modified keyword. Meanwhile, a vocabulary dictionary may have been stored in advance in the electronic device 100, or may be included in an external server.

For example, in case 'mylovelygirl' is acquired as a keyword, the electronic device 100 may acquire 'my lovelygirl' and 'mylovely girl' as candidates for a modified keyword. The electronic device 100 may compare each of the candidates for a modified keyword with a vocabulary dictionary, and identify that 'girl' included in 'my lovelygirl' is a syllable included in the vocabulary dictionary. In contrast, the electronic device 100 may identify that 'mylovely' included in 'mylovely girl' is not included in the vocabulary dictionary. That is, the electronic device 100 may acquire 'my lovelygirl' as a modified keyword of 'mylovelygirl.' However, the aforementioned embodiment is merely an example, and the electronic device 100 may acquire a plurality of respective modified keywords with respect to a plurality of keywords.

Then, the electronic device 100 may perform a search based on the keyword and the modified keyword and acquire a search result at operation S140. Specifically, the electronic device 100 may acquire a search query for each of the keyword and the modified keyword. Further, the electronic device 100 may perform a search for each query on an open-type knowledge sharing platform. That is, the electronic device 100 may perform a search for each query through an external server.

For example, the electronic device 100 may generate queries in formats such as 'https://ko.wikipedia.org/w/index.php?search=mylovelygirl' and 'https://ko.wikipedia.org/w/index.php?search=my lovelygirl' for crawling a result of an external server.

Also, the electronic device 100 may determine the titles of resulting pages of crawling by utilizing each query as candidate groups of content names. The electronic device 100 may determine candidates of content names including content names included in the database of content names among the candidate groups of content names as valid candidate groups of content names. That is, valid candidate groups of content names may include content names that a user wants and actual content names included in the database of content names.

With respect to each of the valid candidate groups of content names, the electronic device 100 may perform character string comparison with the keyword and the modified keyword acquired by the electronic device 100. Accordingly, the electronic device 100 may acquire a content name having the highest similarity to the keyword and the modified keyword among the valid candidate groups of content names as the content name at operation S150. Further, the electronic device 100 may update the database of content names based on the acquired content name, keyword, and modified keyword.

Through the aforementioned embodiment, the electronic device 100 may search candidates of content names in more various ways through a modified keyword, even though a user utters a command as a content name in an abbreviated form.

Also, by updating the acquired content name together with the modified keyword, the electronic device 100 may provide a search of content names in abbreviated forms to a user, even though abbreviated forms for a keyword have not been separately registered.

Meanwhile, according to an embodiment of the disclosure, the electronic device 100 may communicate with various external devices through wireless or wired communication. Also, the electronic device 100 may transmit and receive data such that external devices perform functions corresponding to voice commands received from a user. Here, a type of an external device may be an electronic device that can output image contents. For example, in case an external device is a television, the type of the external device is an imaging device, and output data information of the television may include the model name of the television, the audio properties of the output contents of the television, the frequency properties of the output audio in the output contents of the television, etc., but the information is not limited thereto. Also, external devices may include a remote controller, a Bluetooth speaker, an illumination device, a smart cleaner, a smart refrigerator, an IOT home manager, etc., as well as devices that can output image contents.

Meanwhile, in case the electronic device 100 is implemented as an electronic device wherein applications such as a smartphone, a smart TV, a smart remote controller, etc. can be installed, the electronic device 100 may operate an application for controlling external devices to perform functions corresponding to recognized voice commands. Such an application may be present on the electronic device 100 from the time of release.

For example, a user may input a voice command such as "Play the A movie" by operating an application in the electronic device 100. Then, the electronic device 100 may transmit a control signal for performing a function corresponding to the voice command to an external device that can output image contents connected to the electronic device 100.

According to another embodiment of the disclosure, the electronic device 100 may not only receive a plurality of audio signals through a microphone inside the electronic device 100, but also a signal corresponding to a user voice input to an external device connected to the electronic device 100. In this case, an external device connected to the electronic device 100 may be a smartphone, a tablet PC, a mobile phone, a remote controller, etc. including a microphone, but is not limited thereto. Here, on the external device, an application for controlling the electronic device 100 may be installed. That is, when a user voice is input through a microphone included in the external device, the external device may transmit the user voice to the electronic device 100 by using the application, and the electronic device 100 may perform the operation in FIG. 1 through the transmitted user voice.

For example, in case the electronic device 100 is implemented as a smart TV, if a user inputs a voice command such as "Play my lovely girl" to a smartphone including a microphone, the electronic device 100 may recognize the voice command of the user based on the audio signal received from the smartphone. Afterwards, the electronic device 100 may output a content in response to the user command.

As described above, the electronic device 100 may transmit and receive a control signal such that an external device that received a voice command or another external device connected to the electronic device 100 performs a function corresponding to the acquired voice command. That is, a user may input an audio signal including a voice command through a microphone included in an external device, and may make not only the electronic device 100 but also another external device connected to the electronic device 100 wirelessly or by wire perform a function corresponding to the voice command.

For example, if a user inputs a voice command such as "Play the B movie" to a smartphone including a microphone, the electronic device 100 may recognize the voice command of the user based on the audio signal received from the smartphone. Afterwards, the electronic device 100 may transmit a control signal such that another electronic device connected wirelessly or by wire plays the B movie. However, the aforementioned embodiment is just an example, and a user may control the electronic device 100 or another external device through various external devices.

Figure 2:
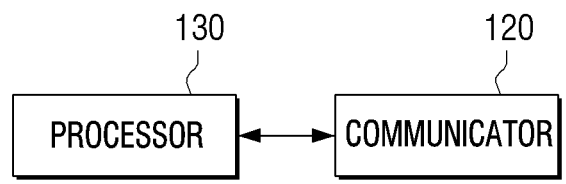
FIG. 2 is a schematic block diagram for illustrating components of an electronic device according to an embodiment of the disclosure.

FIG. 2 is a schematic block diagram for illustrating components of an electronic device according to an embodiment of the disclosure.

Referring to FIG. 2, the electronic device 100 may include a communicator 120 and a processor 130. Depending on embodiments, some of the components illustrated in FIG. 2 may be omitted or modified, or other components may be further added.

The communicator 120 is a component for communicating with an external server 200. The communicator 120 may transmit an audio signal generated from a target source (e.g., a user) selected at the processor among a plurality of sound sources to the external server 200 or an external device. Also, the communicator 120 may receive result data of STT processing or result data of voice recognition performed at the external server 200.

The communicator 120 may communicate with various external devices. Here, a type of an external device may be an electronic device that can output image contents. For example, in case an external device is a television, the type of the external device is an imaging device, and output data information of the television may include the model name of the television, the audio properties of the output contents of the television, the frequency properties of the output audio in the output contents of the television, etc., but the information is not limited thereto. Also, external devices communicating with the communicator 120 may include a remote controller, a Bluetooth speaker, an illumination device, a smart cleaner, a smart refrigerator, an IOT home manager, etc., as well as devices that can output image contents.

In the case of communicating with an external device including a microphone (e.g., a smart phone), the communicator 120 may receive information for an audio signal received by the external device. Here, information for an audio signal may be a digital audio signal which is a converted form of an analog audio signal received by the external device.

Meanwhile, the communicator 120 may receive state information of an external device according to connection information with the electronic device 100. State information of an external device may be at least one of whether the external device and the electronic device 100 are connected, information on the size of audio from an image content output by the external device, the type of the external device, the location of the external device, the angle of the external device, the distance from the external device to the electronic device 100, or the frequency property of a speaker for outputting an image content of the external device. Here, an image content may include video and/or audio.

Meanwhile, the communicator 120 may include a communication module for at least one communication method among Ethernet or cellular communication (e.g.: LTE, LTE-A, CDMA, WCDMA, UMTS, Wibro, or GSM) through Wifi (wireless fidelity), BT (Bluetooth), NFC (near field communication), GPS (global positioning system), and CSMA/CD (carrier sense multiple access/collision detection) methods. The communicator 120 may be implemented as a plurality of communicators corresponding to such at least one communication module.

According to an embodiment of the disclosure, the communicator 120 may use a Wi-Fi module for communicating with an external device such as a remote controller and the external server 200. Alternatively, in case the communicator 120 is implemented as a plurality of communicators, the communicator 120 may use a communicator including at least one of an Ethernet modem or a Wi-Fi module for communicating with the external server 200, or use a communicator including a BT module for communicating with an external device such as a remote controller. However, this is just an example, and the disclosure is not limited thereto.

The processor 130 controls the overall operations of a program module stored in a memory and the electronic device 100, and detailed explanation of the processor 130 will be made later with reference to FIGS. 3 and 4.

Figure 3:
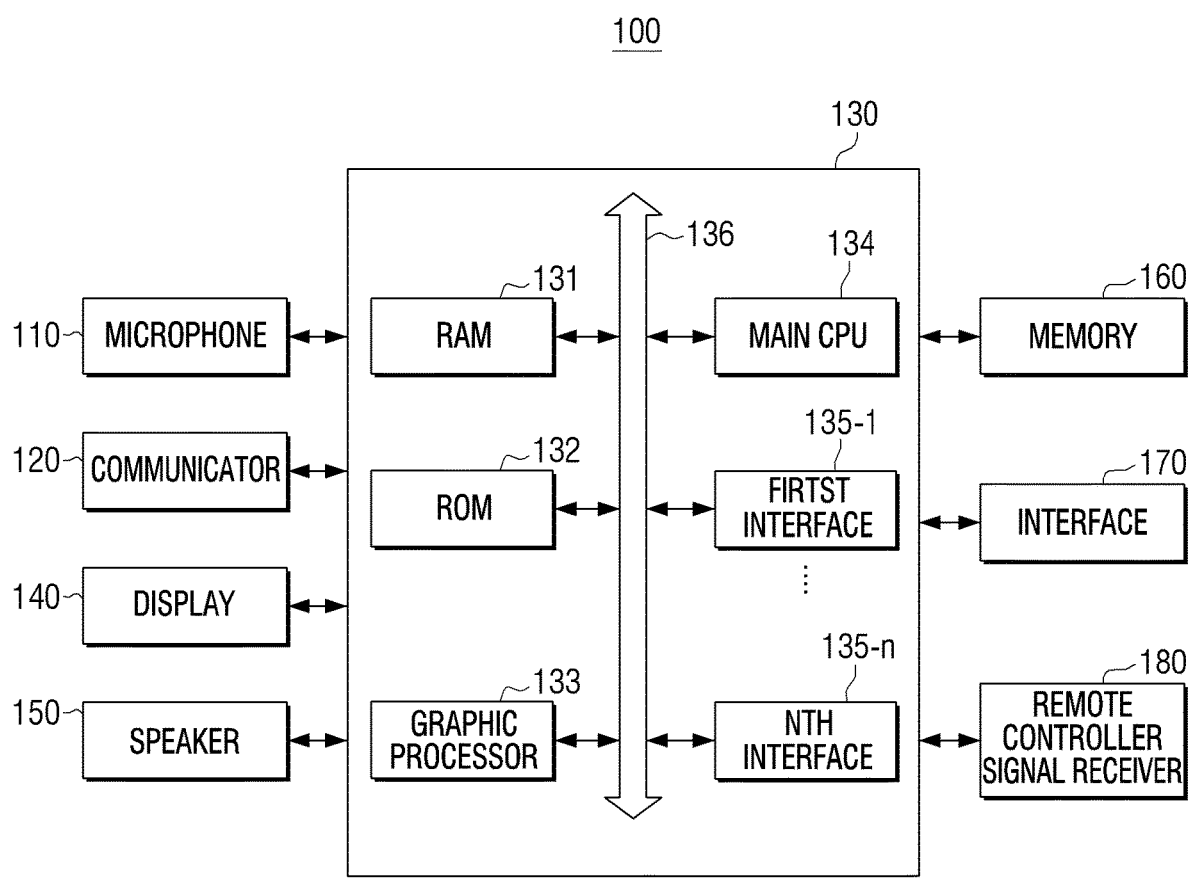
FIG. 3 is a detailed block diagram for illustrating components of an electronic device according to an embodiment of the disclosure.

FIG. 3 is a detailed block diagram for illustrating components of an electronic device according to an embodiment of the disclosure.

Referring to FIG. 3, the electronic device 100 may include a microphone 110, a communicator 120, a display 140, a speaker 150, a memory 160, an interface 170, a remote controller signal receiver 180 and a processor 130 electronically connected for controlling the aforementioned components. As the communicator 120 was explained with reference to FIG. 2, overlapping explanation will be omitted.

The microphone 110 receives input of an audio signal including a user voice, processes the audio signal, and generates a user voice signal. Here, the microphone 110 may be provided on the main body of the electronic device 100, but this is merely an example, and the microphone 110 may be provided outside the main body (e.g., a remote controller or a separate microphone, etc.). In case the microphone 110 is provided outside the main body, the microphone 110 may transmit a user voice signal generated through a wired/wireless interface (e.g., Wi-Fi, Bluetooth, etc.) to the main body of the electronic device 100. Depending on embodiments, the microphone 110 may include an analog-digital converter (ADC), an energy determination part, a noise removal part, and a voice signal generation part.

According to an embodiment of the disclosure, the microphone 110 may have a microphone array consisting of a plurality of microphones (e.g., four). The microphone array consisting of a plurality of microphones may estimate the input direction and distance of a sound source by using gain and delay information of an audio input signal for each microphone. According to an embodiment of the disclosure, the microphone array may consist of directional or omnidirectional microphones, and the directional microphones and the omnidirectional microphones may be mixed.

The display 140 may display various screens generated at the graphic processor 133, for performing functions corresponding to voice commands received by the electronic device 100.

The display 140 may be implemented as a liquid crystal display (LCD) panel, an organic light emitting diode (OLED), etc., but is not limited thereto. Also, the display 140 may be implemented as a flexible display, a transparent display, etc. depending on cases.

Also, the display 140 according to an embodiment of the disclosure may include not only a display panel outputting images, but also a bezel housing the display panel. In particular, a bezel according to an embodiment of the disclosure may include a touch detector (not shown) for detecting user interactions.

Meanwhile, in case the electronic device 100 is implemented as a device not including the display 140 like a set top box, the electronic device 100 may be implemented as an interface (e.g., an HDMI, etc.) for outputting image data to the outside.

The speaker 150 is a component outputting not only various audio data processed at the audio processor 170, but also various notification sounds or voice messages. In particular, in case a content displayed on the display 140 is a content related to music, the speaker 150 may output the sound source of the played content.

The memory 160 may store various data for the overall operations of the electronic device 100 such as a program for processing or controlling the processor 130. Also, the memory 160 may store a plurality of application programs or applications operated at the electronic device 100, and data and commands for the operations of the electronic device 100. At least some of such application programs may be downloaded from an external server through wireless communication. Also, at least some of such application programs may be present on the electronic device 100 from the time of release for the basic functions of the electronic device 100. Application programs are stored in the memory 160, and may be operated to perform the operations (or functions) of the electronic device 100 by the processor 130.

The memory 160 may be implemented as a nonvolatile memory, a volatile memory, a flash memory, a hard disk drive (HDD), or a solid state drive (SSD), etc. The memory 160 may be accessed by the processor 130, and reading/recording/correction/deletion/update, etc. of data by the processor 130 may be performed. In the disclosure, the term memory may include the memory 160, ROM 131 and RAM 132 inside the processor 130, or a memory card (not shown) mounted on the electronic device 100 (e.g., a micro SD card, a memory stick, a USB memory, etc.). Also, the memory 160 may include a buffer that temporarily stores various data of music contents.

The interface 170 is a component for connecting an external device and the electronic device 100 for inputting and outputting video and audio. Specifically, the interface 170 may include at least one of a universal serial bus (USB), a high definition multimedia interface (HDMI), a recommended standard 232 (RS-232), a plain old telephone service (POTS) DVI, a display port (DP), or a thunderbolt, which are components for wired communication. An HDMI is an interface that can transmit high performance data for AV devices outputting audio and video. A DP is an interface that can implement not only full HD screens in a 1920×1080 size, but also super resolution screens in a 2560×1600 or 3840×2160 size, and 3D stereoscopic images, and can also transmit digital voices. A thunderbolt is an input and output interface for transmission and connection of high speed data, and may connect all of a PC, a display, a storage device, etc. in parallel with one port.

However, the aforementioned input and output terminals are merely examples, and the interface 170 may include a port for outputting only audio signals or a port for outputting only video signals, other than such terminals.

The remote controller signal receiver 180 may receive a user command input through a remote controller. Also, the remote controller signal receiver 180 may receive a remote controller signal through a BT module. Meanwhile, the remote controller signal receiver 180 may be included in the communicator 120 for wireless communication, depending on embodiments.

The processor 130 controls the overall operations of the electronic device 100 by using various programs stored in the memory 160.

As illustrated in FIG. 3, the processor 130 includes a RAM 131, a ROM 132, a graphic processor 133, a main CPU 134, first to nth interfaces 135-1~135-n, and a bus 136. Here, the RAM 131, the ROM 132, the graphic processor 133, the main CPU 134, the first to nth interfaces 135-1~135-n, etc. may be connected with one another through the bus 136.

The ROM 132 stores a set of instructions, etc. for system booting. When a turn-on instruction is input and power is supplied, the main CPU 134 copies the O/S stored in the memory 160 in the RAM 131 according to the instruction stored in the ROM 132, and boots the system by executing the O/S. When booting is completed, the main CPU 134 copies various types of application programs stored in the memory 160 in the RAM 131, and performs various operations by executing the application programs copied in the RAM 131.

The graphic processor 133 generates screens including various objects such as icons, images, and texts by using an operation part (not shown) and a rendering part (not shown). The operation part operates attribute values such as coordinate values, shapes, sizes, and colors by which each object will be displayed according to the layout of the screen by using a control command received from the communicator 120. Also, the rendering part generates screens in various layouts including objects, based on the attribute values operated at the operation part. The screens generated at the rending part are displayed in the display area of the display 140.

The main CPU 134 accesses the memory 160, and performs booting by using the O/S stored in the memory 160. Also, the main CPU 134 performs various operations by using various programs, contents, data, etc. stored in the memory 160.

The first to nth interfaces 135-1 to 135-n are connected with the aforementioned various components. One of the interfaces may be a network interface connected with an external device through a network.

According to an embodiment of the disclosure, the processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

More specific components of the processor will be additionally described with reference to FIG. 4.

Figure 4:
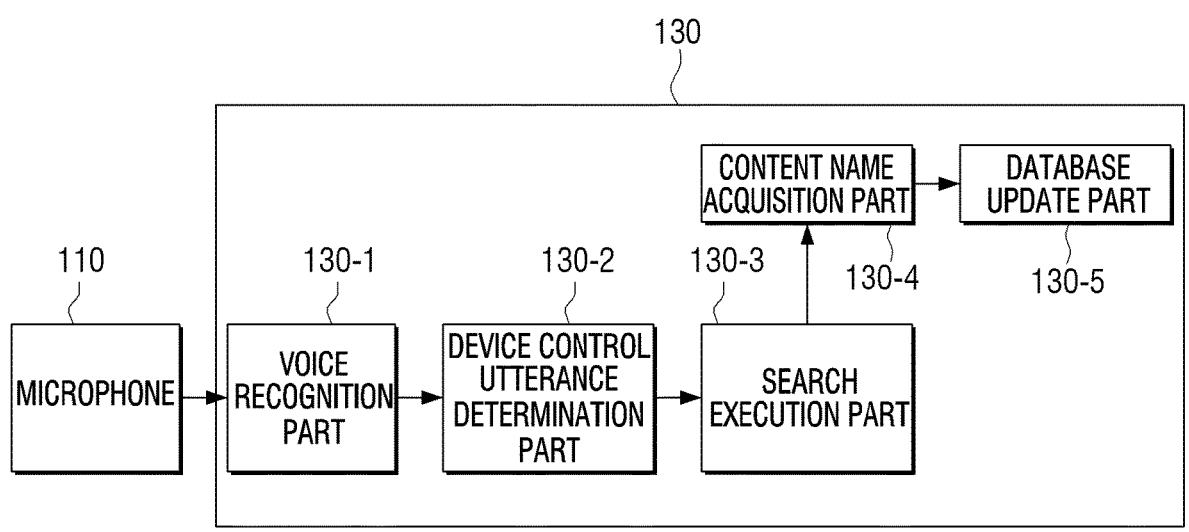
FIG. 4 is a detailed block diagram for illustrating a configuration of a processor according to an embodiment of the disclosure.

FIG. 4 is a detailed block diagram for illustrating a configuration of a processor according to an embodiment of the disclosure.

Referring to FIG. 4, the processor 130 may include a voice recognition part 130-1, a device control utterance determination part 130-2, a search execution part 130-3, a content name acquisition part 130-4, and a database update part 130-5. In the drawing, it was illustrated that each of the aforementioned components was implemented as a separate component, but the disclosure is not limited thereto, and the components may be implemented as at least one component included in the processor 130. Also, although it was illustrated that each component was implemented while being included in the processor 130, the components may be implemented while being included in the external server 200.

The voice recognition part 130-1 is a component for recognizing a voice received from a user through the microphone 110 (or a microphone received from an external device). The voice recognition part 130-1 may be the external server 200 as described above, or may be included in the electronic device 100. Also, the voice recognition part 130-1 may perform an STT process with respect to a received user voice. Here, a component for extracting a voice command of a user from data which went through STT processing may be included in the voice recognition part 130-1. However, according to an embodiment of the disclosure, the voice recognition part 130-1 may perform only a role of an STT, and a component extracting a voice command of a user may be included in a separate server or device. Afterwards, the electronic device 100 may perform a function corresponding to the extracted voice command of a user, and transmit the voice command of a user to an external device such that the external device connected to the electronic device 100 performs a function corresponding to the extracted voice command of a user.

The device control utterance determination part 130-2 may determine whether a user voice is a command for controlling the electronic device 100. That is, in case a voice uttered by a user includes a command for controlling the electronic device 100, the electronic device 100 may perform a function corresponding to the command. In the disclosure, a device control utterance may mean all functions excluding the function of the electronic device 100 of searching a content for playing the content. The device control utterance determination part 130-2 may determine a command keyword based on data recognized from the voice recognition part 130-1, and determine what the device control command that a user uttered through a voice is.

The search execution part 130-3 is a component for performing a search based on a text included in a voice input from a user. Here, a text included in an input voice may include a keyword related to a content for generating a query for a search, and the keyword may be extracted through the device control utterance determination part 130-2 based on data recognized at the voice recognition part 130-1. Also, the search execution part 130-3 may control the communicator 120 to transmit data for a search to an external server for performing a search.

The content name acquisition part 130-4 is a component for acquiring the name of a content uttered by a user, in case a user utters the name of a content in an abbreviated form. The electronic device 100 may acquire a content name through the content name acquisition part 130-4, and then play a content corresponding to the content name. Afterwards, the electronic device 100 may update an abbreviated form of the content name and the content name in the database of content names through the database update part 130-5.

Figure 5:
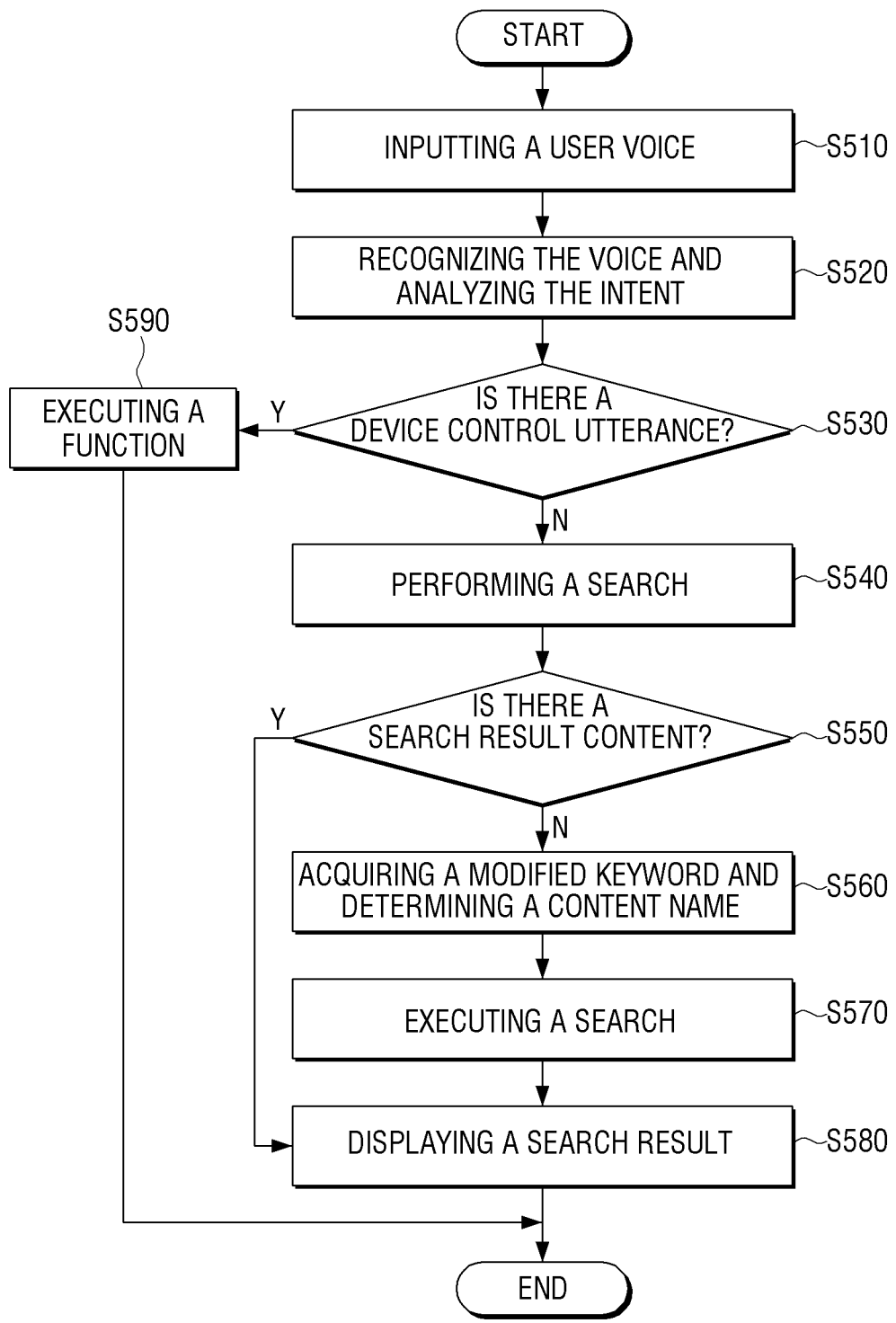
FIG. 5 is a flow chart for illustrating an overall process wherein an electronic device operates after receiving input of a user voice according to an embodiment of the disclosure.

FIG. 5 is a flow chart for illustrating an overall process wherein an electronic device operates after receiving input of a user voice according to an embodiment of the disclosure.

The electronic device 100 may receive input of a user voice at operation S510, and analyze the intent through recognition of the user voice at operation S520. Then, the electronic device 100 may determine whether the user voice is an utterance for device control at operation S530, and in case the utterance is an utterance for device control at operation S530-Y, the electronic device 100 may execute a corresponding function at operation S590. Here, a device control utterance may be a voice instructing the electronic device 100 to perform another function excluding content search and playing functions. For example, in case a user utters a voice 'Turn off the power,' the electronic device 100 may determine the utterance as a command for controlling the device such that the power is turned off, and execute a power off function.

In case the user voice is not an utterance for device control at operation S530-N, the electronic device 100 may search a corresponding content in a pre-stored content database based on a keyword acquired through voice recognition, etc. at operation S540. Here, the keyword may be a keyword related to a content.

If it is determined that there is a corresponding content in the pre-stored content database at operation S550-Y, the electronic device 100 may display a corresponding search result at operation S580, and play the corresponding content. Meanwhile, if it is determined that there is no corresponding content in the pre-stored content database at operation S550-N, the electronic device 100 may acquire a modified keyword for the acquired keyword, and perform a search through a multi query, and thereby determine a content name at operation S560. In case a user instructs playing of a content with a content name in an abbreviated form generally used instead of a content name provided by the provider, the electronic device 100 may determine that there is no corresponding content in the pre-stored content database. This will be described in detail with reference to FIG. 6. The electronic device 100 may perform a search in the pre-stored database based on the content name at operation S570, and display a search result at operation S580.

Figure 6:
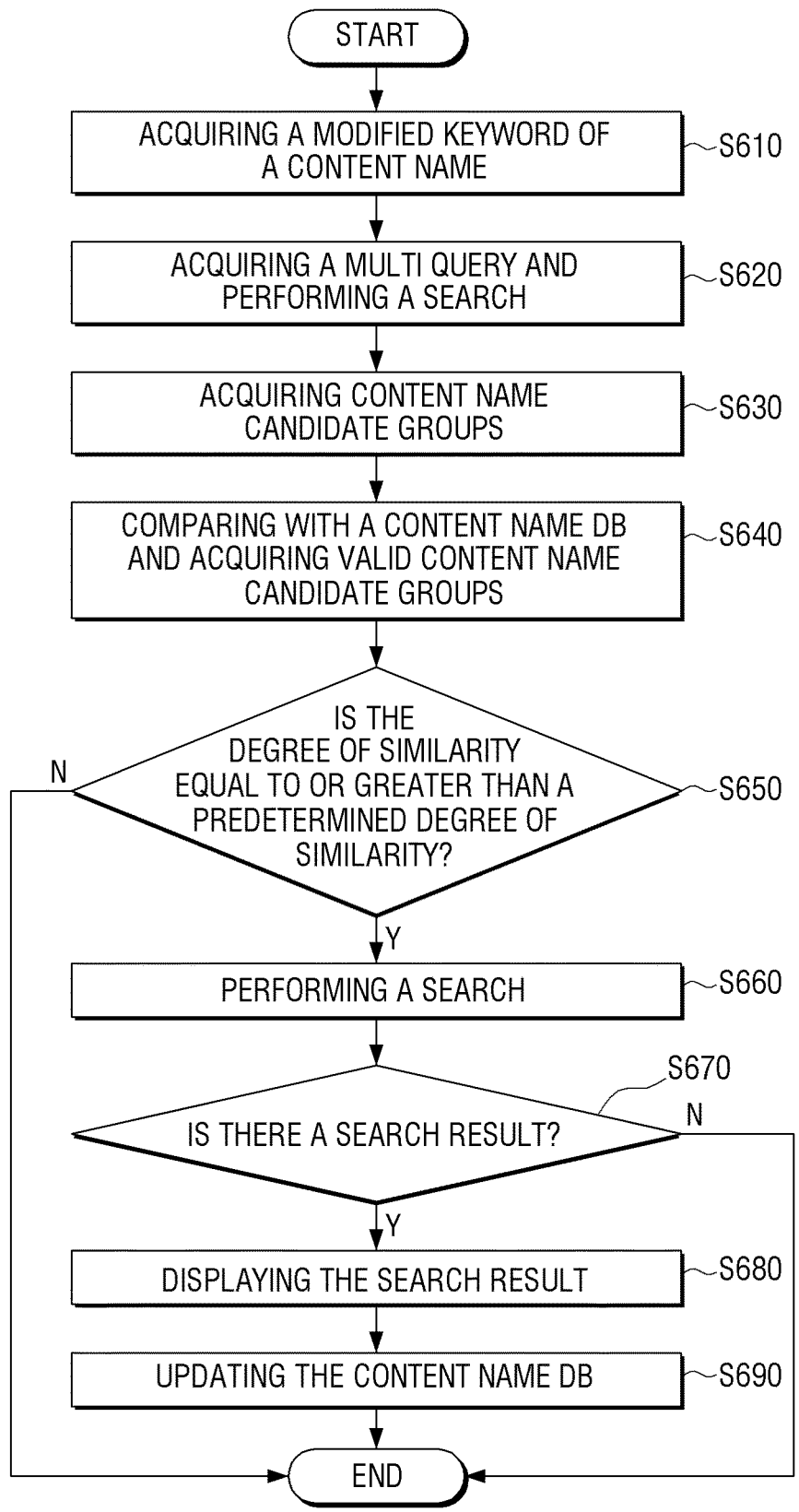
FIG. 6 is a flow chart for illustrating a process wherein an electronic device operates after receiving input of a content name in an abbreviated form according to an embodiment of the disclosure.

FIG. 6 is a flow chart for illustrating a process wherein an electronic device operates after receiving input of a content name in an abbreviated form according to an embodiment of the disclosure.

The electronic device 100 may acquire a keyword related to a content from an input user voice, and acquire a modified keyword through the keyword at operation S610. Then, for each syllable of the acquired keyword, the electronic device 100 may compare a combination of each syllable and the syllables on both sides with a vocabulary dictionary. Specifically, the electronic device 100 may identify each syllable of the acquired keyword, and add spacings among the syllables. Then, the electronic device 100 may delete the spacings among the syllables in turn, and thereby acquire word phrases wherein each syllable is combined. Afterwards, the electronic device 100 may determine whether each syllable exists in the vocabulary dictionary. As a result of comparison with the vocabulary dictionary, the electronic device 100 may determine a keyword including a word phrase existing in the vocabulary dictionary among candidates for a modified keyword as a modified keyword.

The electronic device 100 may generate a query for a search in an external server in the form of an open-type knowledge sharing platform (e.g., Wikipedia) based on the acquired keyword and modified keyword at operation S620. That is, the electronic device 100 may perform a search by using a multi query in case a modified keyword for a keyword was acquired.

That is, the electronic device 100 may acquire candidate groups for a content name by crawling the search result using a multi query at operation S630. Specifically, the electronic device 100 may include only titles for the acquired search result in the candidate groups for a content name by using a multi query. Here, the candidate groups for a content name may include not only the name of the content that a user wants to watch, but also various texts such as names of other contents, characters related to each content, topics related to contents, etc.

Also, the electronic device 100 may compare the candidate groups for a content name with the database of content names at operation S640. Here, the database of content names is a plurality of content names provided by a plurality of providers, and may have updated the results of searches by a plurality of users with respect to a content name. Such a database of content names may be stored in an external server and may be updated and transmitted to the electronic device 100 periodically.

The electronic device 100 may select only texts included in the database of content names among the candidate groups for a content name and extract the texts as valid candidate groups for a content name. That is, in the valid candidate groups for a content name, only actual names of a content may be included.

In addition, for each text included in the valid candidate groups for a content name, the electronic device 100 may perform character string comparison with a keyword and a modified keyword. The electronic device 100 may determine a text having a degree of similarity equal to or greater than a predetermined degree of similarity to a keyword and a modified keyword among the texts in the valid candidate groups for a content name as the content name. That is, in case a degree of similarity is equal to or greater than a predetermined degree of similarity at operation S650-Y, the electronic device 100 may perform a search with the text (or content name) at operation S660. In case a search result exists at operation S670-Y, the electronic device 100 may display the search result on the display at operation S680, and update the result in the content name DB at operation S690. Here, in case the electronic device 100 is implemented as an electronic device wherein there is no display, the electronic device 100 may output the search result to an external display device.

Meanwhile, the above embodiment is merely an example, and the electronic device 100 may determine a text having the biggest similarity to a keyword and a modified keyword among the valid candidate groups for a content name as the content name.

Figure 7:
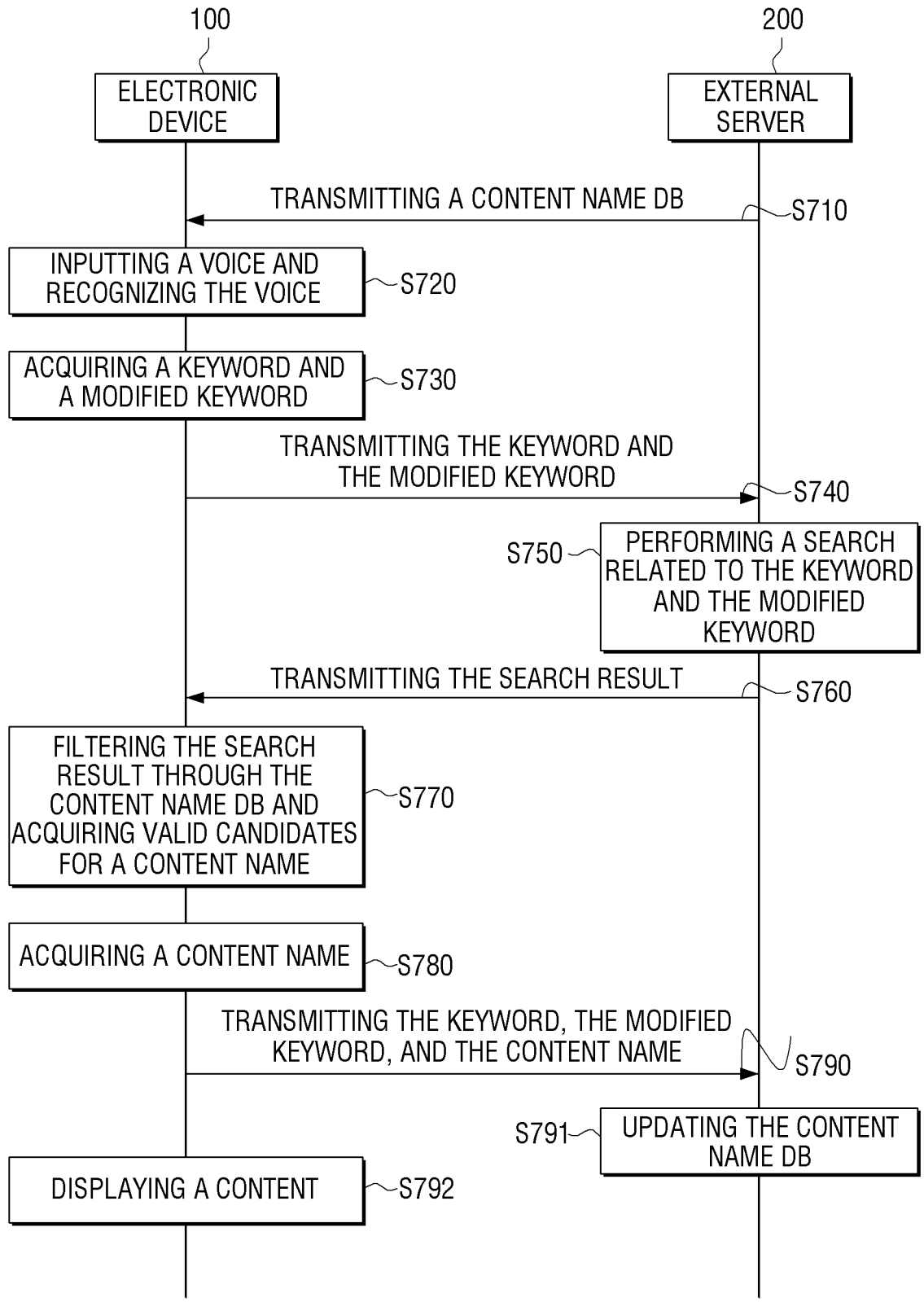
FIG. 7 is a sequence diagram for illustrating an operation that an electronic device performs with an external server with respect to a content name in an abbreviated form according to an embodiment of the disclosure.
Figure 8:
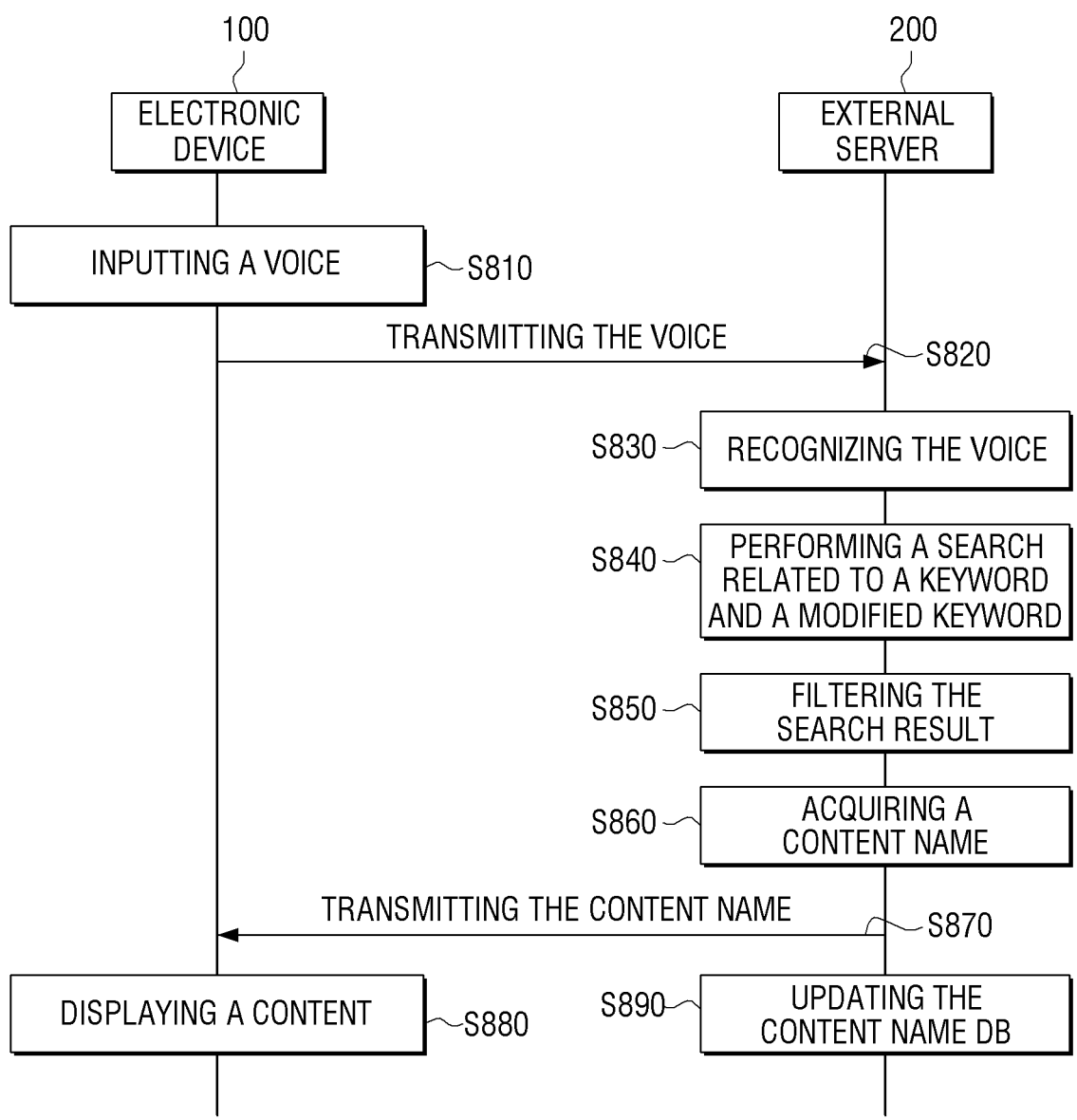
FIG. 8 is a sequence diagram for illustrating an operation that an electronic device performs with an external server with respect to a content name in an abbreviated form according to an embodiment of the disclosure.

FIGS. 7 and 8 are sequence diagrams for illustrating an operation that an electronic device performs with an external server with respect to a content name in an abbreviated form according to an embodiment of the disclosure.

Referring to FIG. 7, the electronic device 100 may receive a content name DB provided by the provider from the external server 200 at operation S710. Here, the content name DB may have updated a search history of an external user for a plurality of contents. For example, in case there is a search history of a plurality of users for a 'GAME OF THRONE' content through an abbreviated form 'GOT,' the external server 200 may update the database by combining 'GOT' with 'GAME OF THRONE.' In this case, the electronic device 100 may provide a service such that a user can play the 'GAME OF THRONE' content through the search keyword 'GOT.'

Meanwhile, the electronic device 100 may receive input of a voice from a user and recognize the voice at operation S720. Then, the electronic device 100 may acquire a keyword and a modified keyword thereof at operation S730, and transmit the keywords to the external server 200 at operation S740. The external server 200 may perform a search at an external server in the form of an open-type knowledge sharing platform through a multi query based on the received keyword and modified keyword at operation S750. Also, the external server 200 may crawl the search result and extract candidate groups for a content name, and transmit the extracted candidate groups for a content name to the electronic device 100 at operation S760. The electronic device 100 may compare the search result, i.e., the candidate groups for a content name with the content name DB and filter it, and thereby acquire valid candidate groups for a content name at operation S770. Afterwards, the electronic device 100 may acquire a content name through character string comparison of the valid candidate groups for a content name with the keyword and the modified keyword at operation S780. Afterwards, the electronic device 100 may display a content corresponding to the content name at operation S792. Here, in case the electronic device 100 is implemented as an electronic device wherein there is no display, the electronic device 100 may output the content corresponding to the content name to an external display device.

Meanwhile, the electronic device 100 may transmit the keyword, the modified keyword, and the content name to the external server 200. Then, the external server 200 may combine the name of a content corresponding to the content name among the contents included in the database of content names received with the keyword and the modified keyword, and update the database at operation S791. However, the aforementioned embodiment is just an example, and the order that the electronic device 100 and the external server 200 transmit and receive data may be changed according to various embodiments.

In FIG. 7, an embodiment wherein the electronic device 100 recognizes a voice, acquires a keyword and a modified keyword, and acquires a content name was described, but the disclosure is not limited thereto. That is, the process of recognizing a voice, acquiring a keyword and a modified keyword, and acquiring a content name may be performed at the external server 200.

Referring to FIG. 8, the electronic device 100 may receive input of a voice as described above, and then transmit the voice to the external server 200 immediately at operations S810 and S820. Afterwards, the external server 200 may recognize the received voice at operation S830, acquire a keyword and a modified keyword for the voice and perform a search at operation S840, filter the search result through the database of content names at operation S850, and acquire a content name at operation S860. Further, the external server 200 may transmit the content name to the electronic device 100 and update the content name DB at operation S890. The electronic device 100 may display a content corresponding to the content name received from the external server 200 at operation S880.

As described in FIGS. 7 and 8, the process of receiving input of a content name in an abbreviated form, and then acquiring a content name and providing a content to a user may be performed in various ways according to various embodiments. For example, the aforementioned process may be performed only at the electronic device 100 without the external server 200. Alternatively, the external server 200 may be implemented as a server, or as a plurality of servers. In case the external server is a plurality of servers, the external server may be implemented as a first server for voice recognition, a second server performing a search through a multi query, a third server storing and updating the content name DB, etc., but the disclosure is not limited thereto.

Figure 9:
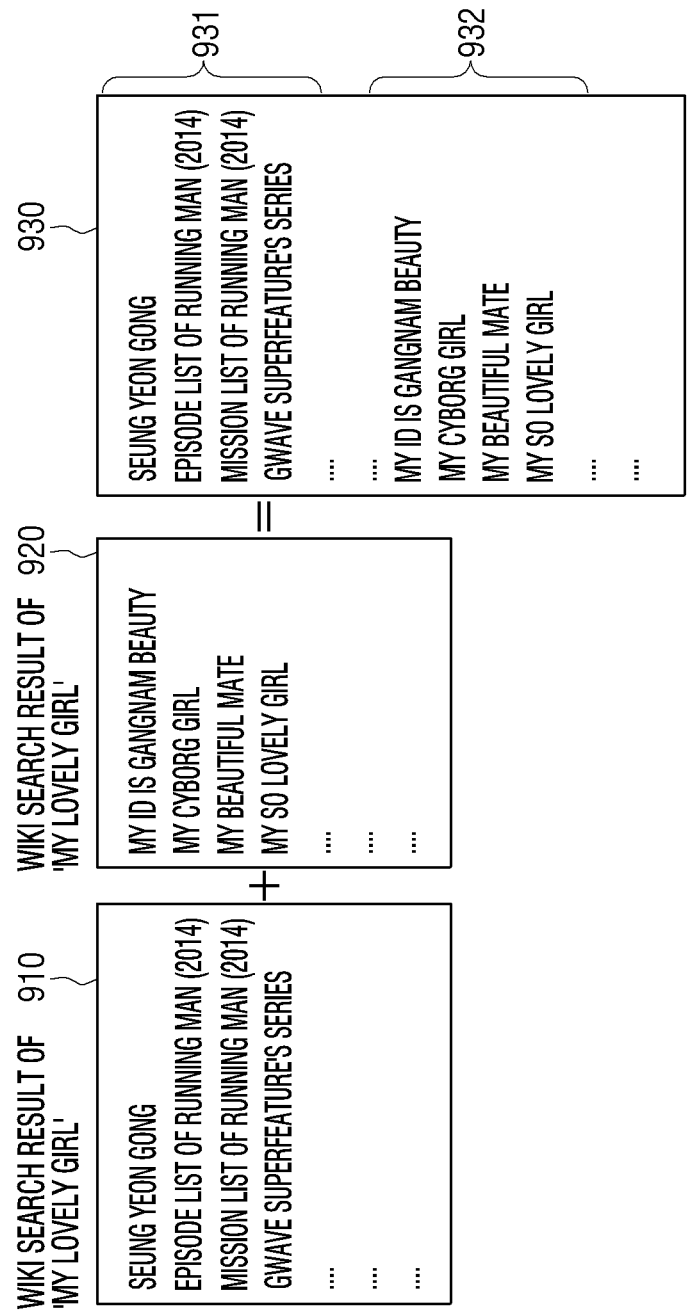
FIG. 9 is a diagram for illustrating an exemplary case of recognition of a content name in an abbreviated form by an electronic device according to an embodiment of the disclosure.
Figure 10B:
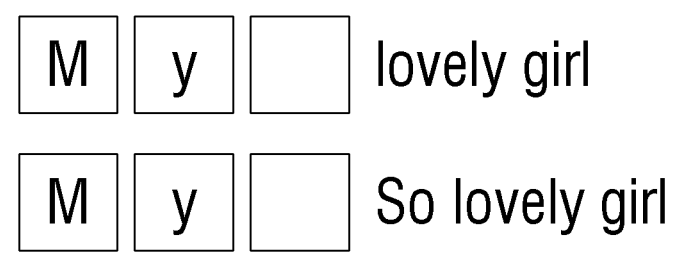

FIGS. 9, 10A, and 10B are diagrams for illustrating an exemplary case of recognition of a content name in an abbreviated form by an electronic device according to an embodiment of the disclosure.

FIG. 9 illustrates an embodiment wherein a search is performed through an abbreviated form 'mylovelygirl' for searching a content 'My So Lovely Girl.' The electronic device 100 may acquire 'mylovelygirl' as a keyword in a user command 'Play mylovelygirl,' and acquire 'my lovelygirl' as a modified keyword of 'mylovelygirl.'

Referring to FIG. 9, the electronic device 100 may search a query generated based on 'mylovelygirl' in an external server in the form of an open-type knowledge sharing platform (e.g., Wikipedia), and acquire a first search result 910 of crawling the title. Likewise, the electronic device 100 may search a query generate based on 'my lovelygirl' which is a modified keyword, and acquire a second search result 920 of crawling the title. In the aforementioned embodiment, an embodiment of acquiring one modified keyword was illustrated, but the disclosure is not limited thereto, and a plurality of modified keywords may be acquired from one keyword. Also, the electronic device 100 may acquire information for a content through various search tools, as well as an open-type knowledge sharing platform.

The electronic device 100 may acquire candidate groups for a content name 930 by combining the first search result 910 and the second search result 920. Meanwhile, the candidate groups for a content name 930 may include not only a text which is a content name but also a text 931 which is not a content name. In this regard, the electronic device 100 may filter the candidate groups for a content name 930 through a pre-stored database of content names. The database of content names is a list of a plurality of content names provided by a plurality of providers, and the electronic device 100 may extract only texts which are content names from the candidate groups for a content name 930 through filtering through the database of content names, and acquire valid candidate groups for a content name 932.

FIGS. 10A and 10B are diagrams for illustrating an embodiment of performing character string comparison for acquiring a content that a user wants among valid candidate groups for a content name.

Referring to FIG. 10A, the electronic device 100 may perform character string comparison between 'my lovelygirl' which is a modified keyword and 'My ID is Gangnam Beauty' among valid candidate groups for a content name. With respect to 'my' and the spacing in 'my lovelygirl,' the electronic device 100 may determine that there is an identical element in 'My ID is Gangnam Beauty,' but with respect to 'lovely' and girl' in 'my lovelygirl,' the electronic device 100 may determine that there is no identical element. In this case, the electronic device 100 may perform character string comparison with the next text among the valid candidate groups for a content name.

Referring to FIG. 10B, the electronic device 100 may perform character string comparison between 'my lovelygirl' which is a modified keyword and 'My So Lovely Girl' among valid candidate groups for a content name. For 'my' in 'my lovelygirl,' the spacing, 'lovely,' and 'girl,' the electronic device 100 may determine that there are identical elements to all of them in 'My So Lovely Girl.' In this case, the electronic device 100 may determine that the character string similarity to the keyword and the modified keyword is 100%, determine 'My So Lovely Girl' as the content name, and play 'My So Lovely Girl.' Also, the electronic device 100 may combine 'mylovelygirl' and 'my lovelygirl' with 'My So Lovely Girl' included in the database of content names and update the database. Afterwards, in case a user searches a content through 'mylovelygirl' and 'my lovelygirl,' the electronic device 100 may play 'My So Lovely Girl.'

Meanwhile, the terms "a part" or "a module" used in the disclosure include units consisting of hardware, software, or firmware, and may be interchangeably used with terms such as logic, a logic block, a component, and a circuit. Also, "a part" or "a module" may become a component consisting of an integrated body, a minimum unit performing one or more functions, or a portion thereof. For example, a module may consist of an application-specific integrated circuit (ASIC).

The various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic device 100). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

According to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: play store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed or omitted in a different order, or other operations may be added.

What is claimed is:

1. A control method of an electronic device comprising:
   receiving user voice input;
   obtaining a keyword related to a content included in the user voice input;
   obtaining a first search result corresponding to the obtained keyword from an external server;
   obtaining a content name related to the content based on the first search result and a content name database;
   in response to the content name not being included in the content name database, obtaining at least one modified keyword based on the obtained keyword;
   obtaining a second search result corresponding to the obtained at least one modified keyword;
   obtaining the content name corresponding to the obtained keyword based on the second search result and the content name database; and
   updating the content name database based on the obtained keyword, the at least one modified keyword, and the obtained content name.

2. The control method of claim 1,
   wherein the obtaining of at least one modified keyword comprises:
   obtaining a text corresponding to an abbreviated expression of a content name among words included in the user voice as the keyword.

3. The control method of claim 1,
   wherein the obtaining of at least one modified keyword comprises:
   identifying the keyword in units of syllables; and
   obtaining at least one word phrase which adjacent syllables are combined with each of the identified syllables, and
   wherein a text including the obtained at least one word phrase is obtained as a modified keyword.

4. The control method of claim 3,
   wherein the obtaining of at least one modified keyword further comprises:
   obtaining a text including a word phrase included in a vocabulary dictionary among texts including the at least one word phrase as the modified keyword.

5. The control method of claim 1,
   wherein the obtaining of a second search result comprises:
   obtaining a plurality of search queries with respect to the obtained at least one modified keyword, and
   wherein the second search result is crawled through an external server based on the obtained plurality of search queries.

6. The control method of claim 1,
   wherein the obtaining of a content name comprises:
   filtering the obtained first search result and the obtained second search result, and
   wherein the filtering comprises:
   obtaining a search result including the obtained content name included in the database of content names among the obtained plurality of search results.

7. The control method of claim 6,
   wherein
   the filtering further comprises:
   performing filtering with respect to a search result including information commonly included in the first search result and the second search result.

8. The control method of claim 1,
wherein the obtaining of a content name further comprises:
  with respect to the obtained first search result and the obtained second search result, performing character string comparison with the obtained keyword and the obtained at least one modified keyword; and
  identifying at least one search result including a degree of similarity equal to or greater than a predetermined degree of similarity based on the performing character string comparison, and
wherein a text included in a search result having a highest degree of similarity among the identified search results is obtained as the content name.

9. An electronic device comprising:
a microphone;
a communicator to perform communication with an external server; and
at least one a memory configured to store at least one instruction; and
at least one a processor configured to execute the at least one instruction to perform a process including:
  controlling the microphone to receive user voice input;
  a keyword related to a content included in the user voice input;
  obtaining a first search result corresponding to the obtained keyword from the external server;
  obtaining a content name related to the content based on the first search result and a content name database;
  in response to the content name not being included in the content name database, obtaining at least one modified keyword based on the obtained keyword;
  obtaining a second search result corresponding to the obtained at least one modified keyword;
  obtaining the content name corresponding to the acquired keyword based on the second search result and the content name database; and
  updating the content name database based on the obtained keyword, the at least one modified keyword, and the obtained content name.

10. The electronic device of claim 9,
wherein the processor further includes
obtaining a text corresponding to an abbreviated expression of a content name among words included in the user voice as the keyword.

11. The electronic device of claim 9,
wherein the processor further includes
identifying the obtained keyword in units of syllables;
obtaining at least one word phrase which adjacent syllables are combined with each of the identified syllables;
obtaining a text including the obtained at least one word phrase as a modified keyword.

12. The electronic device of claim 11,
wherein the processor further includes
obtaining a text including a word phrase included in a vocabulary dictionary among texts including the at least one word phrase as the modified keyword.

13. The electronic device of claim 9,
wherein the processor further includes
obtaining a plurality of search queries with respect to the obtained keyword and the at least one modified keyword; and
crawling a search result through an external server based on the obtained plurality of search queries.

14. The electronic device of claim 9,
wherein the processor further includes
filtering the obtained plurality of search results by obtaining a search result including the obtained content name included in the database of content names among the obtained plurality of search results.

15. The electronic device of claim 14,
wherein the obtained plurality of search results include at least one first search result with respect to the obtained keyword and at least one second search result with respect to each of the obtained at least one modified keyword, and
the processor further includes
filtering with respect to a search result including information commonly included in the first search result and the second search result among the obtained plurality of search results.

16. The electronic device of claim 9,
wherein the processor further includes
with respect to the obtained plurality of search results, performing character string comparison with the obtained keyword and the obtained at least one modified keyword;
identifying at least one search result including a degree of similarity equal to or greater than a predetermined degree of similarity based on the character string comparison result; and
obtaining a text included in a search result having a highest degree of similarity among the identified search results as the content name.

* * * * *